Figure 1:
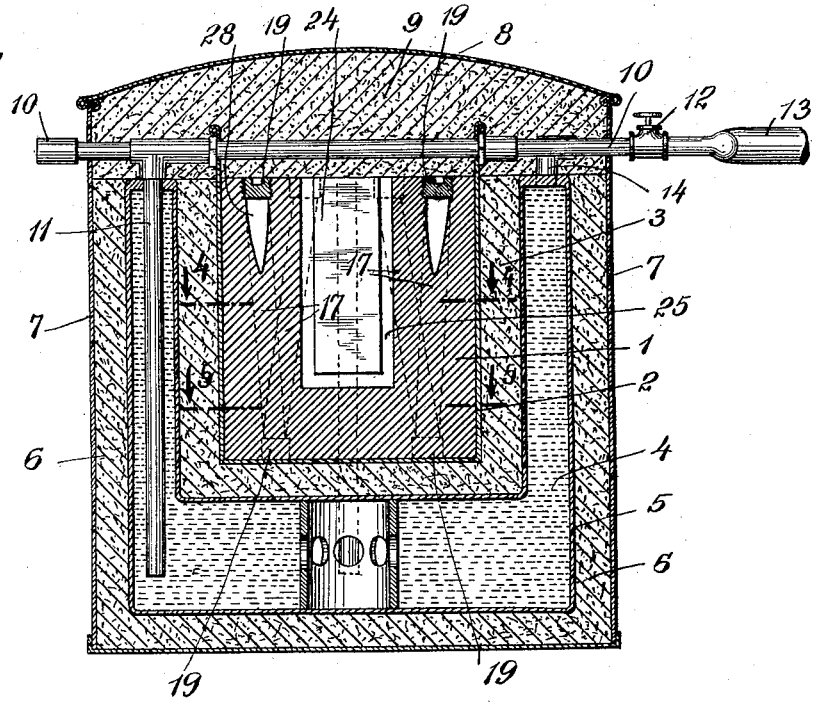

G. G. BELL.
HEAT STORAGE DEVICE FOR HEATING WATER OR OTHER LIQUIDS.
APPLICATION FILED NOV. 7, 1911.

1,069,375.

Patented Aug. 5, 1913.

2 SHEETS—SHEET 1.

WITNESSES:
Geo. M. Harris
J. O. Templer

INVENTOR
George Gilbert Bell
BY
Kenyon & Kenyon
ATTORNEYS

G. G. BELL.
HEAT STORAGE DEVICE FOR HEATING WATER OR OTHER LIQUIDS.
APPLICATION FILED NOV. 7, 1911.
1,069,375.
Patented Aug. 5, 1913.
2 SHEETS—SHEET 2.
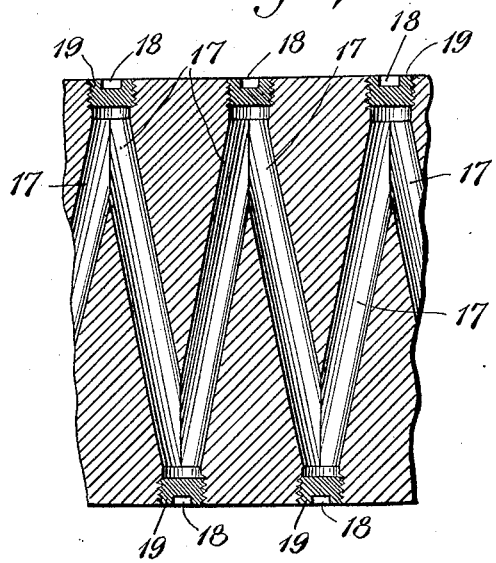
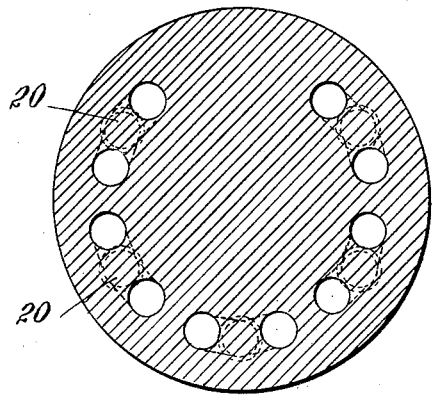
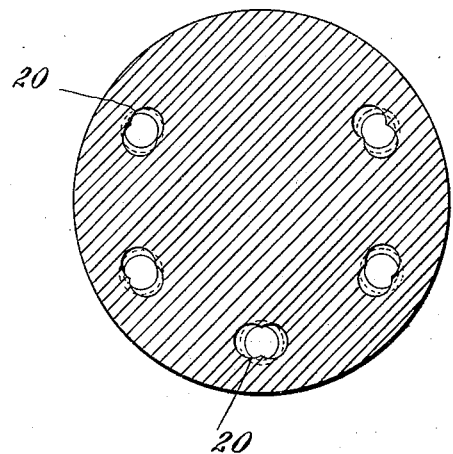
WITNESSES:
INVENTOR
George Gilbert Bell
BY
Kenyon & Kenyon
ATTORNEYS

UNITED STATES PATENT OFFICE.

GEORGE GILBERT BELL, OF KENSINGTON, LONDON, ENGLAND, ASSIGNOR TO ELECTRIC HEAT STORAGE COMPANY, A CORPORATION OF NEW YORK.

HEAT-STORAGE DEVICE FOR HEATING WATER OR OTHER LIQUIDS.

1,069,375.  Specification of Letters Patent.  Patented Aug. 5, 1913.

Application filed November 7, 1911. Serial No. 659,038.

*To all whom it may concern:*

Be it known that I, GEORGE GILBERT BELL, a subject of the King of Great Britain, and a resident of Kensington, London, England, have invented a certain new and useful Improvement in Heat-Storage Devices for Heating Water or other Liquids, of which the following is a specification.

My invention relates to heat storage devices for heating water or other liquids. Its object is to provide a heat storage device for heating water or other liquids, capable of being easily and thoroughly cleansed whenever desired. Heretofore, in such devices, it has been usual to form a curved or spiral channel in the interior of the heat storage mass in order to get sufficient length of channel to heat the water or other liquid sufficiently and to draw the heat from all parts of the heat storage mass. With such a curved or spiral channel, it is very difficult and often impossible to keep it clean. Scale or deposit is apt to settle on the sides of the channel and gradually to fill the channel and decrease the efficiency and capacity of the apparatus. The scale or deposit impedes the passage of the heat and decreases the capacity of the water channel. So serious has this trouble been that other devices have been employed to overcome it as, for example, by doing away entirely with a channel in the heat storage mass and causing that mass to have radiating projections or surfaces projecting into a water chamber. Such an arrangement is, however, nowhere near as efficient in heating water as the channel in and through the center of the heat storage mass itself.

The object of the present invention is to permit the use of a channel in the interior of the heat storage mass, but so arranged that each and every part of the channel can be made readily accessible and be easily and thoroughly cleaned.

My invention consists in the novel devices and combinations herein set forth.

My invention is particularly applicable to water heaters, although not limited in use to such a liquid, and is shown in the drawings as embodied in a water heater.

Figure 2:
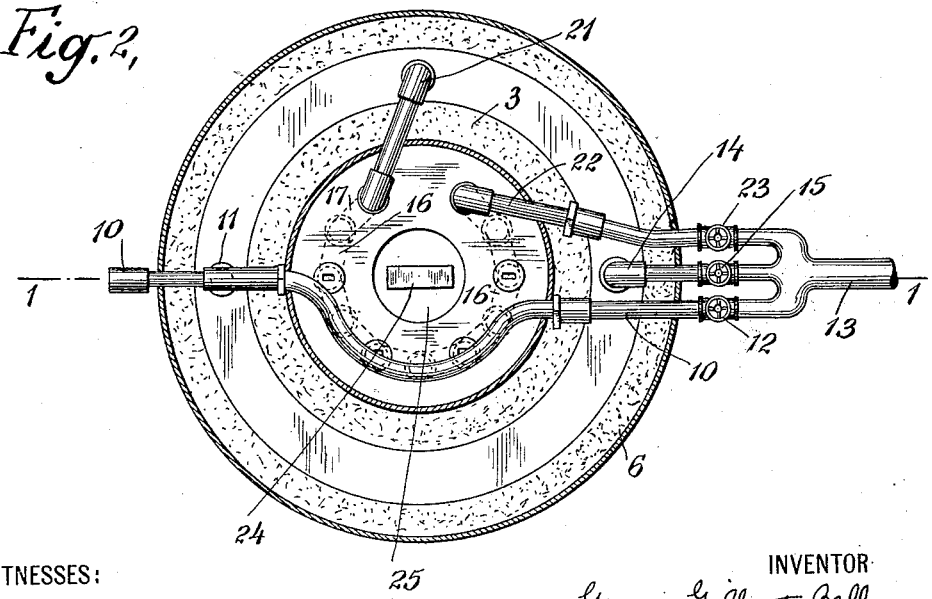

Referring to the embodiment shown in the drawings, Figure 1 is a vertical section on the lines 1—1 of Fig. 2, through a water heater embodying my invention in its preferred form; Fig. 2 is a plan of the same; Fig. 3 is a detail of a number of sections of the water channel through the heat storage mass; Fig. 4 is a horizontal section taken on the lines 4—4 of Fig. 1; and Fig. 5 is a similar section taken on the lines 5—5 of Fig. 1.

My improvement may be used with any suitable heat storage and water heater. Referring to the particular one shown in Figs. 1 and 2, 1 is the heat storage mass having an iron shield 2 surrounding it on all sides except the top. 3 is a layer of magnesia or other suitable heat non-conductor surrounding the heat storage mass. 4 is a water chamber with iron sides 5. This chamber is also surrounded by a layer of magnesia or other heat non-conductor 6 and an exterior iron covering 7. 8 is a cover or lid and 9 is a layer of magnesia non-conductor lying over the heat storage mass and below the lid.

Water may be supplied in any suitable way to the mass. As shown, 10 is the supply pipe provided with a branch 11 leading down into the water tank 4. Pipe 10 is provided with a cock 12 leading to a discharge pipe 13. 14 is an outlet pipe from water chamber 4, having a cock 15, leading to discharge pipe 13.

Throughout the heat storage mass passes a channel 16 composed of a plurality of sections 17, 17, each section being straight and adjoining sections being inclined to each other and joining each other at one end near the exterior surface of the heat storage mass, and forming at such a point an opening into the continuous channel 16 from the outside of the heat storage mass. These inclined sections are clearly shown in Fig. 3, the adjoining sections 17 meeting at each end and forming an opening at point 18. The various sections 17 constitute the continuous channel 16 running through the heat storage mass from one surface to another and preferably arranged so as to form a circular channel in the interior of the heat storage mass. Any suitable arrangement of the sections may be made, and they may run from any surface to another surface of the heat storage mass. Preferably, they are arranged so as to permeate the entire block. In this way the greatest efficiency is obtained. The openings 18 are normally closed. Any suitable means may be employed for this purpose. The means shown consist of removable screw-threaded stoppers 19.

When the water heater is in operation, the stoppers are in place and effectually close the openings. They leave, however, a sufficient passageway between adjoining sections 17 where they meet and underneath the plugs 19, so that a continuous channel is provided from one section into the next, and so on all the way around the sections. Figs. 1, 4 and 5 show at 20, 20 the shape of the space made by the meeting of two adjoining sections. In the heater shown, a pipe 21 passes up from water chamber 4 and connects with the first section 17 of the water channel, its plug 19 being removed for that purpose. More or less heated water thus passes from the water chamber 4 through pipe 21 into the first section 17, and then through all of the sections 17, and during its passage is highly heated or turned into steam, and passes out from the last section 17 into pipe 22 provided with cock 23, and can be discharged into outlet pipe 13.

Any suitable means may be employed for heating the heat storage mass. This forms no part of the invention, and I have merely illustrated the presence of an electric heating element 24 for this purpose. This heating element is located in a space 25 in the center of the heat storage mass 1, and electric current is supplied to it from mains (not shown).

Any suitable method may be employed for making the channel 16 in the heat storage mass. Preferably, it is cored. Whenever it is desired to clean out the water channel 16, the plugs 19 are screwed out, and then each section 17 being opened and being straight, can be very easily and thoroughly cleaned, and all the scale and deposit on the sides can be removed without any difficulty. After the cleansing, all that is necessary is to screw the plugs 19 back into place and the heater is ready for use again in as good condition as when originally made.

What I claim as new and desire to secure by Letters Patent, is:

1. The combination of a heat storage mass, a channel through the mass for water or other liquid composed of a plurality of sections, each section being straight and running through the heat storage mass from one surface to another and adjoining sections being inclined to each other and joining each other at one surface of the heat storage mass to form a continuation of the channel and to give an opening into such channel at the joining point from the outside of the mass, and removable stoppers for such openings, whereby a continuous channel for heating water or other liquid will be provided in the heat storage mass, normally closed during use, except at its ends, but capable, when not in use, of having openings to the exterior of the mass for cleaning purposes.

2. The combination of a heat storage mass, composed of a block of iron, a channel for heating water or other liquid cored through said block, composed of a plurality of sections, each section being straight and running through the heat storage mass from one surface to another and adjoining sections being inclined to each other and joining each other at one surface of the heat storage mass to form a continuation of the channel and to give an opening from the outside of the mass into such channel at the joining point, and removable stoppers for such openings, whereby a continuous channel for heating water or other liquid will be provided in the heat storage mass, normally closed during use, except at its ends, but capable, when not in use, of having openings to the exterior of the mass for cleaning purposes.

In testimony whereof, I have signed my name to this specification, in the presence of two subscribing witnesses.

GEORGE GILBERT BELL.

Witnesses:
HERBERT D. JAMESON,
O. J. WORTH.

---

Copies of this patent may be obtained for five cents each, by addressing the "Commissioner of Patents, Washington, D. C."